US009707884B2

(12) United States Patent
Ekladyous et al.

(10) Patent No.: US 9,707,884 B2
(45) Date of Patent: Jul. 18, 2017

(54) CAMOUFLAGED VEHICLE HAVING ADDITIONAL LIGHTING EQUIPMENT

(71) Applicant: FORD GLOBAL TECHNOLOGIES, LLC, Dearborn, MI (US)

(72) Inventors: Albert Ekladyous, Shelby Township, MI (US); Arun Kumar, Farmington Hills, MI (US); Diane Marie LaHaie, Ann Arbor, MI (US); Kelley Maria Adams-Campos, Ferndale, MI (US); Mahendra Somasara Dassanayake, Bloomfield Hills, MI (US); Hardyal Singh, Canton, MI (US); Sleiman N. Abdelnour, Macomb, MI (US)

(73) Assignee: FORD GLOBAL TECHNOLOGIES, INC., Dearborn, MI (US)

( * ) Notice: Subject to any disclaimer, the term of this patent is extended or adjusted under 35 U.S.C. 154(b) by 205 days.

(21) Appl. No.: 14/642,871

(22) Filed: Mar. 10, 2015

(65) Prior Publication Data
US 2016/0264039 A1    Sep. 15, 2016

(51) Int. Cl.
B60Q 1/18    (2006.01)
B60Q 1/14    (2006.01)
(Continued)

(52) U.S. Cl.
CPC ............ B60Q 1/1407 (2013.01); B60Q 1/18 (2013.01); B60Q 11/00 (2013.01); F41H 3/00 (2013.01);
(Continued)

(58) Field of Classification Search
CPC .. B60Q 1/0035; B60Q 1/0088; B60Q 1/1407; B60Q 1/18; B60Q 1/2615; B60Q 11/00;
(Continued)

(56) References Cited

U.S. PATENT DOCUMENTS 5,434,758 A    7/1995  Zeidler
5,847,643 A *  12/1998 Keith ................. B60Q 1/52
                                                          180/274
(Continued)

FOREIGN PATENT DOCUMENTS

DE        3911896 A1    10/1990
DE    102005044404 A1     3/2007
KR      20140111820 A     9/2014

OTHER PUBLICATIONS

Federal Register vol. 72, Issue 232, S1-S3.3, published Dec. 4, 2007, retrieved Nov. 18, 2016 from www.gpo.gov.*

(Continued)

Primary Examiner — Anh Mai
Assistant Examiner — Steven Horikoshi
(74) Attorney, Agent, or Firm — Jason C. Rogers; King & Schickli, PLLC

(57) ABSTRACT

A camouflaged vehicle includes a vehicle having lighting equipment and a plurality of windows, a camouflage positioned over an exterior of the vehicle and allowing visibility through at least a portion of the plurality of windows, and additional lighting equipment supported by said vehicle outside of said camouflage. At least a portion of the lighting equipment may be visible through the camouflage. A control module for controlling the lighting equipment is provided and the additional lighting equipment is controlled by the control module in parallel with the lighting equipment, and sensors, positioned between the control module and the lighting equipment, sense the application of power and generate additional control signals to operate the additional lighting equipment. The additional lighting equipment may include a minimum number of lamps, reflective devices and associated equipment required to satisfy the requirements of Federal Motor Vehicle Safety Standard No. 108.

17 Claims, 9 Drawing Sheets

(51) Int. Cl.
  *F41H 3/00* (2006.01)
  *B60Q 11/00* (2006.01)
  *B60Q 1/26* (2006.01)
(52) U.S. Cl.
  CPC ........ *B60Q 1/2615* (2013.01); *B60Q 2900/10* (2013.01)
(58) Field of Classification Search
  CPC ...... B60Q 2900/10; B60R 13/04; F21S 48/12; F21S 48/1225; F21S 48/2218; F21S 48/15; F21S 48/155; F41H 3/00; F41H 3/02
  See application file for complete search history.

(56) References Cited

U.S. PATENT DOCUMENTS

| | | |
|---|---|---|
| 8,007,155 B2 | 8/2011 | Bolander, Jr. et al. |
| 8,585,233 B1 | 11/2013 | Torres |
| 2005/0111231 A1* | 5/2005 | Crodian ............... B60Q 1/1423 362/545 |
| 2009/0134661 A1* | 5/2009 | Sugiura ................. B60J 5/0411 296/146.9 |
| 2016/0121799 A1* | 5/2016 | McClintock ......... B60Q 1/2661 224/309 |

OTHER PUBLICATIONS

English machine translation of DE 102005044404.
English machine translation of DE 3911896.
English machine translation of KR 20140111820.

* cited by examiner

CAMOUFLAGED VEHICLE HAVING ADDITIONAL LIGHTING EQUIPMENT

TECHNICAL FIELD

This document relates generally to camouflaged vehicles used in road testing, and more specifically to a camouflaged vehicle used in road testing having additional lighting equipment.

BACKGROUND

New vehicles and refreshed vehicle designs are traditionally revealed annually to the public during spectacular promotional events known as auto shows. These auto shows are where the styling and features of the new vehicles and refreshed designs are first revealed to the public. Prior to such an unveiling, pre-production builds of vehicles are tested to identify and correct any issues relating to design, tooling, processes, customer usage, servicing, etc. The pre-production vehicles are also used to test the durability and reliability of the vehicle, as well as, all legal requirements of the vehicle as a whole. Such testing is conducted both in labs, on test tracks, and on public roads.

During vehicle development, and certainly before taking a vehicle out onto public roads for testing, it is common to mask or camouflage at least portions of the exterior of the vehicle in order to prevent public viewing of the unique styling and features prior to the official revealing and launch into the market. As shown in FIG. 1, it is known to utilize a soft camouflage 10 with a number of foam or acrylonitrile butadiene styrene (ABS) inserts 12 (not shown) under the soft camouflage to alter the perceived shape and styling lines of the vehicle 14, or patterned vinyl wraps/camouflage 16 covering exterior surfaces 18 of the vehicle, or a combination of these two approaches. It is likewise known to cover or mask vehicle wheels 20.

As one of the most visible and contributing features to the styling or appearance of a vehicle is its exterior lighting equipment (e.g., headlamps, front signal lamps, rear signal lamps, fog lamps, center high mounted stop lamp), the exterior lighting equipment is generally covered as well. This includes both the front and rear components of the lighting equipment. While some components 22 (e.g., backup lamps) are partially covered by camouflage 16 such that a limited area is exposed, as shown in FIG. 2, other components 24 (e.g., brake lamps) remain uncovered. The exposed areas of partially components themselves can often be covered with a mesh cloth in order to mask as much of the lighting component as possible while allowing visibility of emitted light. As a result, forward visibility of the driver and vehicle conspicuity can be adversely affected.

In order to minimize any such adverse effects, while protecting the confidentiality of the styling and features of the vehicle, including the exterior lighting equipment, a need exists for a new approach to vehicle camouflage. Such an approach would necessarily hide the vehicle styling and the exterior lighting equipment features but would provide adequate lighting equipment to ensure forward visibility and vehicle conspicuity. This may include additional exterior lighting equipment. In order to support testing of the original lighting equipment, however, the additional lighting equipment could operate in parallel and be controlled and powered, at least partially, independent of the original lighting equipment. In this manner, the original lighting equipment is continually working in a normal use state and is evaluated under that state, i.e., a real customer usage, in order to unearth any issues relating to customer usage, durability and/or reliability.

This document relates to a camouflaged vehicle having a camouflage positioned over an exterior of the vehicle and additional lighting equipment supported by the vehicle outside of the camouflage. Advantageously, this ensures the forward visibility of the driver and vehicle conspicuity during road testing in particular. Even more, the additional lighting equipment can be operated in parallel with the original lighting equipment in order to minimize any effect on testing outcomes and to ensure the legality of the vehicle, if desired.

SUMMARY

In accordance with the purposes and benefits described herein, a camouflaged vehicle is provided. The camouflaged vehicle may be broadly described as comprising a vehicle having lighting equipment and a plurality of windows, a camouflage positioned over an exterior of the vehicle and allowing visibility through at least a portion of the plurality of windows, and additional lighting equipment supported by said vehicle outside of said camouflage.

In accordance with one possible embodiment, at least a portion of the lighting equipment is visible through the camouflage. In yet another, a control module for controlling the lighting equipment is provided and the additional lighting equipment is controlled by the control module in parallel with the lighting equipment.

In accordance with still another possible embodiment, the control module generates control signals to operate the lighting equipment, and sensors, positioned between the control module and the lighting equipment, sense the application of power and generate additional control signals to operate the additional lighting equipment.

In another possible embodiment, the camouflaged vehicle includes a power source for providing power to the vehicle including the lighting equipment, and an additional power source for providing power to the additional lighting equipment.

In accordance with an additional possible embodiment, the additional lighting equipment includes a minimum number of lamps, reflective devices and associated equipment to satisfy the requirements of Federal Motor Vehicle Safety Standard No. 108.

In accordance with still another possible embodiment, the additional lighting equipment includes at least two headlamps, at least two taillamps, at least two stoplamps, at least one high-mounted stoplamp, at least one license plate lamp, at least two parking lamps, at least two intermediate side reflex reflectors, at least two intermediate side marker lamps, at least four side marker lamps, at least one backup lamp, at least four turn signal lamps, at least one turn signal operating unit, at least one turn signal flasher, and at least one vehicular hazard warning signal operating unit, and at least one vehicular hazard warning signal flasher.

In accordance with an additional aspect, a camouflaged vehicle comprises a vehicle having lighting equipment and a plurality of windows, a camouflage attached to an exterior of the vehicle and allowing visibility through at least a portion of the plurality of windows, and additional lighting equipment mounted to an exterior of the camouflage.

In yet another possible embodiment, the additional lighting equipment includes at least two additional headlamps, at least two additional taillamps, at least two additional parking lamps, and at least one license plate lamp, and further comprising a driver operated switch for controlling the at least two additional headlamps, the at least two additional taillamps, the at least two additional parking lamps, and the at least one license plate lamp.

In still another possible embodiment, the camouflaged vehicle includes a control module for controlling the lighting equipment, and the additional lighting equipment further includes at least two additional turn signal lamps, at least two additional stoplamps, and at least one additional backup lamp, and wherein the at least two additional turn signal lamps, the at least two additional stoplamps, and the at least one additional backup lamp is controlled by the control module in parallel with the lighting equipment.

In accordance with another possible embodiment, the control module generates control signals to operate the lighting equipment, and wherein sensors, positioned between the control module and the lighting equipment, sense the application of power and generate additional control signals to operate the at least two additional turn signal lamps, the at least two additional stoplamps, and the at least one additional backup lamp.

In yet another possible embodiment, at least a portion of the lighting equipment is visible through the camouflage. In another, the camouflaged vehicle includes a power source for providing power to the vehicle including the lighting equipment, and an additional power source for providing power to the additional lighting equipment.

In accordance with another aspect, a method of operating a vehicle such that its exterior attributes including its lighting equipment are substantially obscured from visibility is provided. The method may be broadly described as comprising the steps of: (a) covering an exterior of the vehicle with a camouflage except for at least a portion of a plurality of windows; (b) supporting additional lighting equipment adjacent the covered lighting equipment; and (c) operating the lighting equipment and the additional lighting equipment in parallel.

In one possible embodiment, the method further includes the steps of powering the lighting equipment using a power source, and powering the additional lighting equipment using an additional power source.

In another possible embodiment, the method further includes the steps of sensing the powering of components of the lighting equipment, and generating an additional control signal to the additional lighting equipment upon sensing the powering of components of the lighting equipment. The additional control signal causes power to be provided to like components of the additional lighting equipment (e.g., brake lamps and additional brake lamps).

In another possible embodiment, the additional lighting equipment includes at least two additional headlamps, at least two additional taillamps, at least two additional parking lamps, and at least one license plate lamp; and the method further includes the step of controlling the powering step for the at least two additional headlamps, the at least two additional taillamps, the at least two additional parking lamps, and the at least one license plate lamp using a switch operated by an occupant of the vehicle.

In still another possible embodiment, the lighting equipment includes at least two turn signal lamps, at least two stoplamps, and at least one backup lamp, and the method further includes the steps of sensing a control signal generated by a control module and directed to at least one of the at least two turn signal lamps, the at least two stoplamps, and the at least one backup lamp, and providing an additional control signal to a corresponding at least one of the at least two additional turn signal lamps, at least two additional stoplamps, and at least one additional backup lamp.

In the following description, there are shown and described several preferred embodiments of the camouflaged vehicle and the related methods. As it should be realized, the vehicles and method are capable of other, different embodiments and their several details are capable of modification in various, obvious aspects all without departing from the assemblies and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the camouflaged vehicle and together with the description serve to explain certain principles thereof. In the drawing figures.

Reference will now be made in detail to the present embodiments of the camouflaged vehicle and the related methods, examples of which are illustrated in the accompanying drawing figures, wherein like numerals are used to represent like elements.

DETAILED DESCRIPTION

Figure 1:
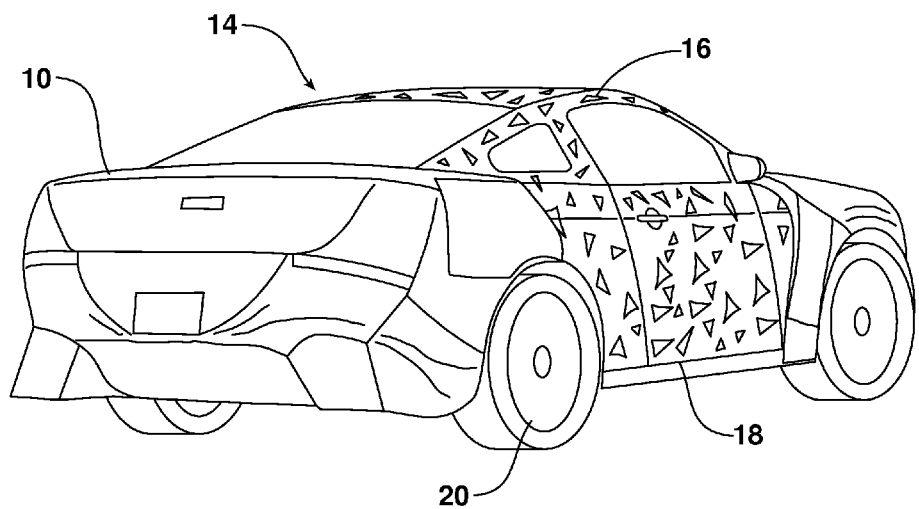
FIG. 1 is a perspective view of a camouflaged vehicle utilizing both patterned vinyl camouflage and soft camouflage with foam inserts positioned underneath and covering all of the components of the exterior lighting equipment.
Figure 2:
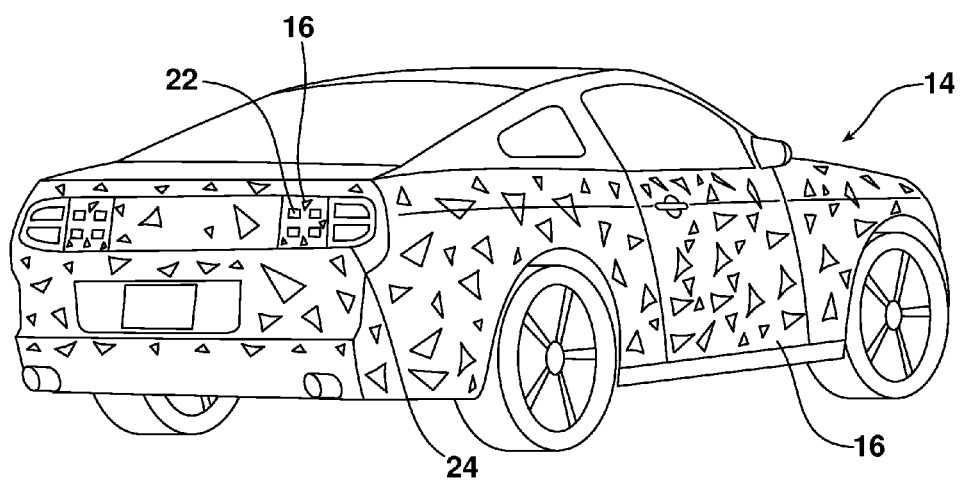
FIG. 2 is a perspective view of a partially camouflaged vehicle having components of its exterior lighting equipment at least partially exposed.
Figure 3:
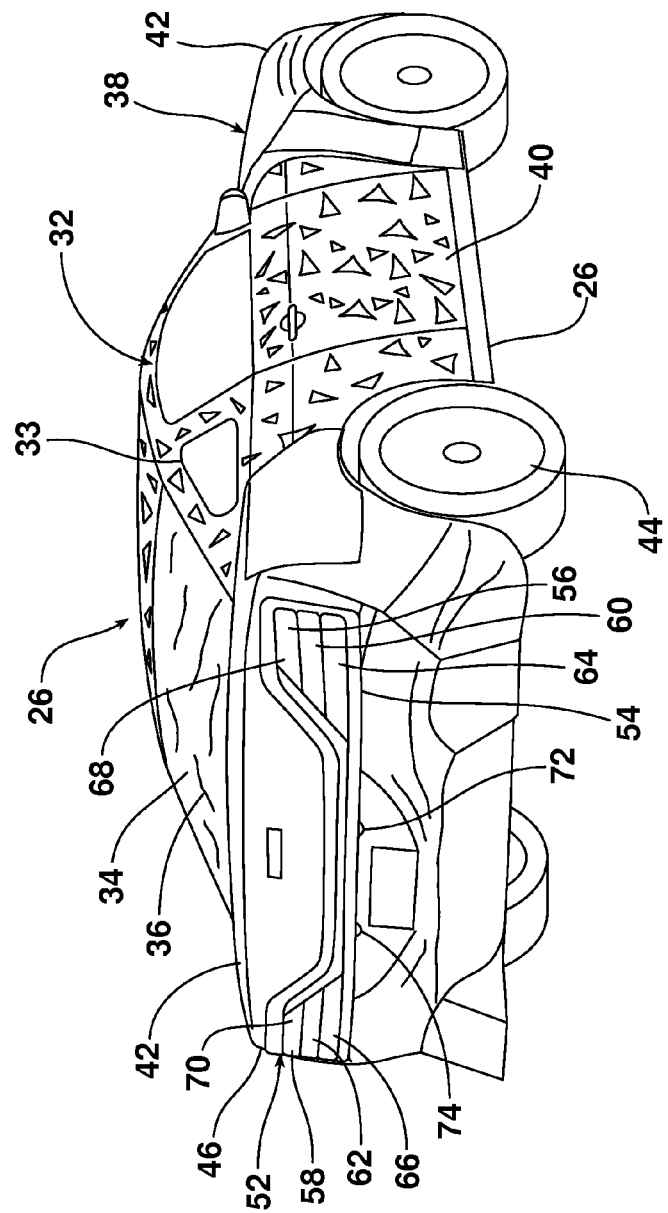
FIG. 3 is a perspective view of a camouflaged vehicle utilizing both patterned vinyl camouflage and soft camouflage covering all of the exterior lighting equipment and having additional lighting equipment on the rear of the vehicle.

Reference is now made to FIG. 3 which broadly illustrates an embodiment of a camouflaged vehicle 26 having exterior lighting equipment 28 (not shown) and a plurality of windows 30. In the described embodiment, all of the components of the lighting equipment 28 are covered by a camouflage 32 positioned over an exterior of the vehicle 26, and the plurality of windows 30 include uncovered windows 33 and covered windows 34. The covered windows 34 are covered by a clear plastic or vinyl 36 that provides at least some visibility through at least a portion of the plurality of windows 30 as required to drive the vehicle 26.

The camouflage 32, in the described embodiment, includes both patterned vinyl camouflage 40 shown positioned over the door panel and roof and soft camouflage 42 shown positioned over the front and rear vehicle ends. Foam inserts (not shown) or like materials are positioned underneath or within the soft camouflage 42 at varying locations in order to alter the perceived shape and styling of the vehicle 26. In alternate embodiments, the camouflage may include only the vinyl camouflage or only the soft camouflage, or varying percentages of each in combination depending upon the features desired to be obscured from view. Even more, the camouflage may be positioned over only portions of the exterior of the vehicle (e.g., the driver side and passenger side doors may have no camouflage). The vehicle wheels may likewise be covered or masked with camouflage 44.

Figure 4:
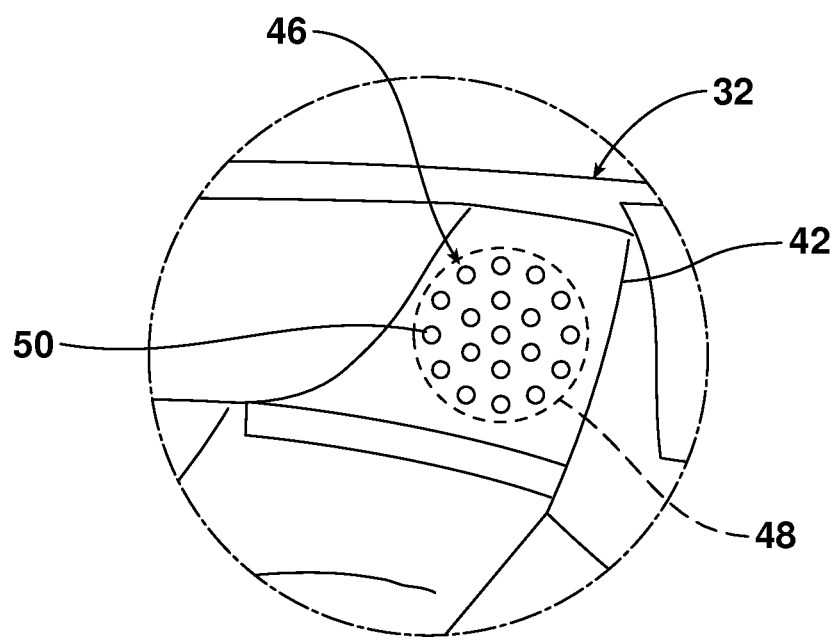
FIG. 4 is a partial perspective view of a right taillamp partially covered by a mesh portion of the soft camouflage.
Figure 5:
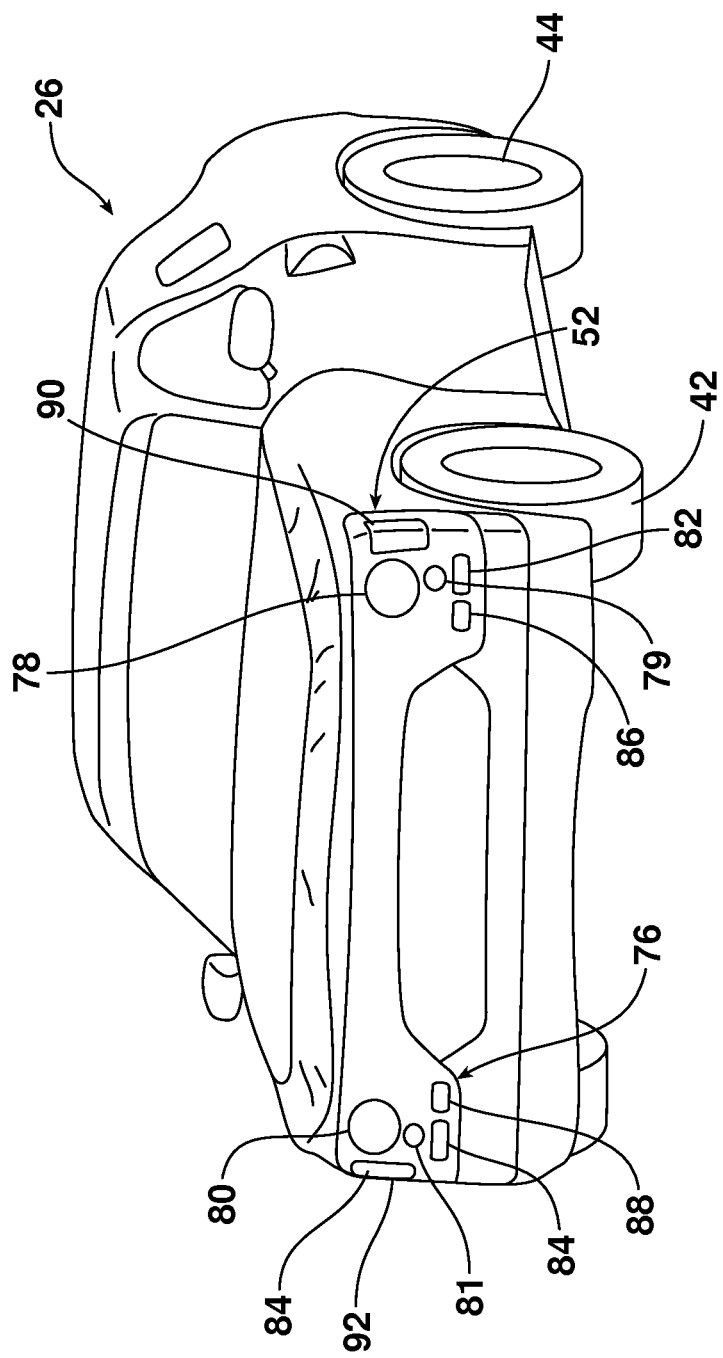
FIG. 5 is a perspective view of a camouflaged vehicle utilizing both patterned vinyl camouflage and soft camouflage covering all of the exterior lighting equipment and having additional lighting equipment on the front of the vehicle.

As illustrated in FIG. 3, each of the components of the exterior lighting equipment 28 are positioned beneath the camouflage 32. In one possible embodiment shown in FIG. 4, the camouflage 32 may include mesh portions 46, for example, adjacent the taillamps 48 (shown in dashed line) such that light emitted from the taillamps can be seen. In this instance, the mesh portion 46 is formed from a plurality of holes 50 in the soft camouflage 42 while in other embodiments, the mesh portions may be constructed in any manner (e.g., made of connected strands of metal, fiber, or other flexible/ductile materials) that is generally known in the art. Independent mesh portions may be glued, sewn, or otherwise secured or attached to the camouflage in position adjacent the desired components of the exterior lighting equipment.

As further shown in FIG. 3, additional lighting equipment 52 is supported by the vehicle 26 outside of the camouflage 32. In the described embodiment, the additional lighting equipment 52 includes a rear assembly 54 which includes right and left signal lamps 56, 58, taillamps 60, 62, stoplamps or brake lamps 64, 66, backup lamps 68, 70, and license plate lamps 72, 74. The rear assembly 54 may be supported by the vehicle in any manner. As an example, the rear assembly 54 may be attached or affixed to the soft camouflage 42 using hook and loop products (e.g., Velcro® brand). Alternatively, the rear assembly may be rigidly supported by the vehicle 26. For example, the rear assembly may be connected to a bracket which itself is connected to a part of the vehicle (e.g, an impact bar or frame, among other vehicle parts).

The additional lighting equipment 52 may further include a front assembly 76 which includes right and left low beam headlamps 78, 80, high beam headlamps 79, 81, signal lamps 82, 84, parking lamps 86, 88, and side marker lamps 90, 92. As with the rear, the front assembly 76 may be supported by the vehicle 26 in any manner. As an example, the front assembly may be attached or affixed to the soft camouflage 42 using hook and loop products or more rigidly by a bracket which itself is connected to the vehicle (e.g, an impact bar, or frame among others). In accordance with the invention, the front and rear assemblies can be attached to the vehicle in any manner.

While not required in all embodiments of the present invention, the additional lighting equipment 52 of the described embodiment includes a minimum number of lamps, reflective devices, and associated equipment to satisfy the requirements of Federal Motor Vehicle Safety Standard No. 108. Federal Motor Vehicle Safety Standard No. 108 is herein incorporated by reference in its entirety. For passenger vehicles, such as the vehicle 26 of the described embodiment, this necessarily includes each of the components listed in Table III, entitled Required Motor Vehicle Lighting Equipment [All Passenger Cars and Motorcycles, and Multipurpose Passenger Vehicles, Trucks, Buses and Trailers of Less Than 80 (2032) Inches (mm) Overall Width], which forms a part of the Federal Motor Vehicle Safety Standard No. 108.

The listed components include at least two headlamps, at least two taillamps, at least two stoplamps, at least one high-mounted stoplamp, at least one license plate lamp, at least two parking lamps, at least two intermediate side reflex reflectors, at least two intermediate side marker lamps, at least four side marker lamps, at least one backup lamp, at least four turn signal lamps, at least one turn signal operating unit, at least one turn signal flasher, at least one vehicular hazard warning signal operating unit, and at least one vehicular hazard warning signal flasher. Of course, other embodiments may include more than or less than the minimum number of lamps, reflective devices, and associated equipment required to satisfy the Federal Motor Vehicle Safety Standard No. 108.

Figure 6:
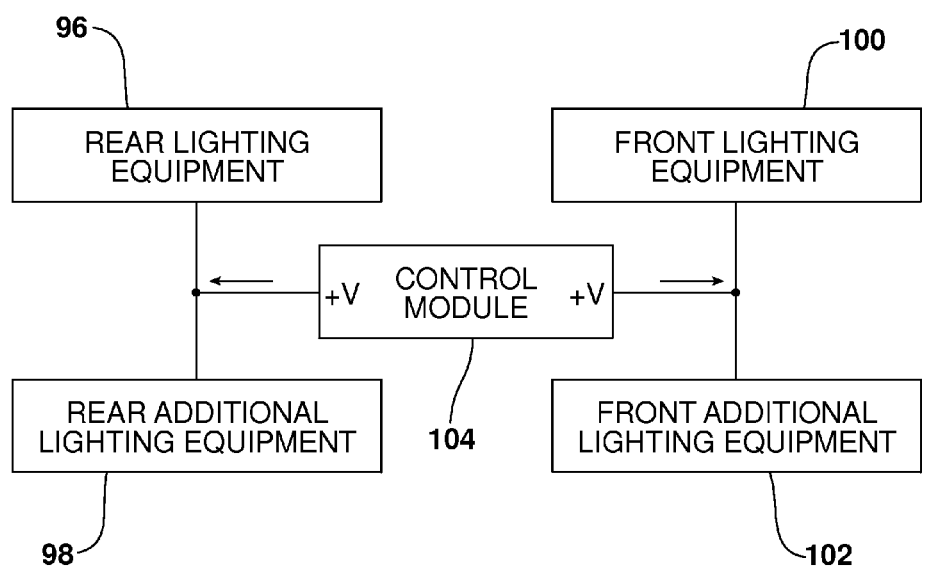
FIG. 6 is a circuit diagram broadly showing the lighting equipment and additional lighting equipment being operated in parallel by a control module.

As shown in FIG. 6, the additional lighting equipment 52 may be controlled in parallel with the lighting equipment 28 in one embodiment. More specifically, the rear lighting equipment 96 may be controlled in parallel with the rear additional lighting equipment 98 and the front lighting equipment 100 may be controlled in parallel with the front additional lighting equipment 102.

Figure 7:
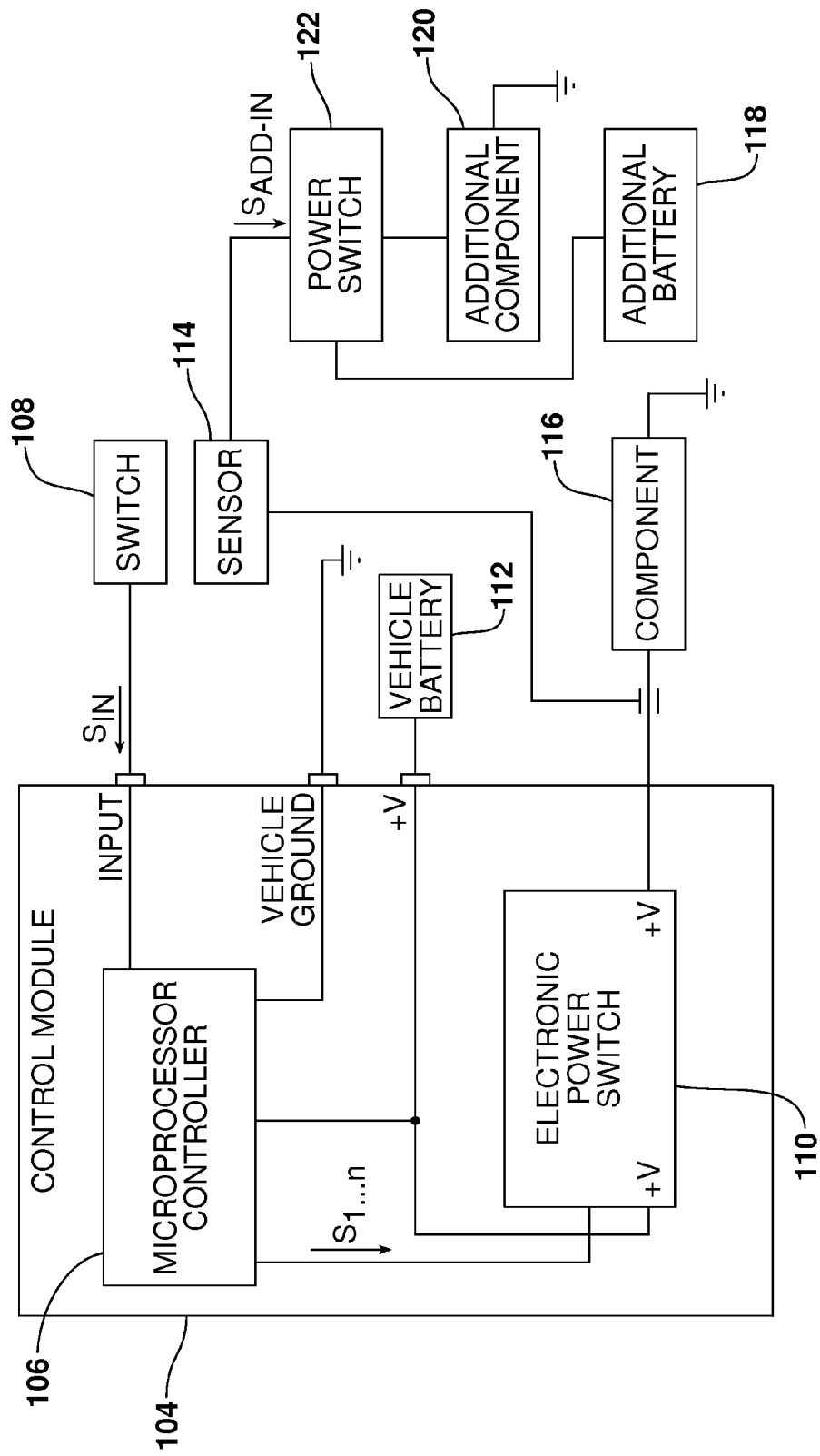
FIG. 7 is an exemplary circuit diagram showing a control module including a processor and power switch providing power to a load and an additional load upon sensing of the application of power to the load by a sensor.

In the described embodiment, a control module 104 of the vehicle 26 controls the lighting equipment 28 as in any modern vehicle. More specifically, as shown in FIG. 7, the control module 104 includes a microprocessor controller 106 that generates control signals ($S_{1\ldots n}$) in response to input signals ($S_{IN (1 \ldots n)}$) from a switch 108 (e.g., a stem switch or other controller). The control signals (e.g., $S_1$) cause electronic power switch 110 to switch vehicle power (e.g., +12 volts) from a vehicle battery 112 to a component of the lighting equipment (e.g., a headlamp) 116.

As further shown, a sensor 114 electrically positioned between the control module 104 and the component of the lighting equipment 116 senses the current flow created by application of the vehicle power to the component 116. The sensor 114 generates an additional input signal ($S_{ADD-IN}$) that causes a power switch 122 (e.g., a relay) to switch auxiliary power from an additional battery 118 to a like additional component (e.g., an additional headlamp) 120 of the additional lighting equipment 52. In other words, the additional input signal ($S_{ADD-IN}$) triggers the application of power from an additional battery to a like additional component. This simplified exemplary circuit may be expanded to include multiple sensors sensing the ON/OFF status of or the application of vehicle power to multiple components of the lighting equipment 28 and generating multiple additional input signals that trigger application of power from additional batteries to like additional components of the additional lighting equipment 52.

The additional vehicle power is separate from the vehicle power in order to avoid any additional loading of the vehicle battery 112 and wiring harness that are designed for the specific loads of the vehicle 26. In other words, additional batteries or battery packs are provided that are sufficient to power all of the additional lighting equipment 52 for a single test outing or multiple test outings. In the described embodiment, the additional battery 118 includes one or more deep discharge gel batteries (e.g., the type used in storing solar power) of a capacity that could power each component of the additional lighting equipment during planned road testing. After one or more road tests, the additional battery 118 can be exchanged for a fully charged replacement battery. In other embodiments, the one or more additional batteries can form an integral part of the components of the additional lighting equipment, or the additional batteries can be carried in or on the vehicle and apart from the additional components.

As indicated above, the control module 104 provides applies a voltage to components of the lighting equipment (e.g., turn lamps, reverse lamps, and/or brake lamps) resulting in current flow within a wiring harness in response to an operator of the vehicle 26 taking an action (e.g., moving a stem switch 108 to an ON position or depressing a brake pedal). The sensor 114 then senses the presence of the current within the wiring harness and uses the sensed current to trigger operation of a like additional component 120 (e.g., turn lamps, reverse lamps, and/or brake lamps) in the additional lighting equipment 52.

Figure 8:
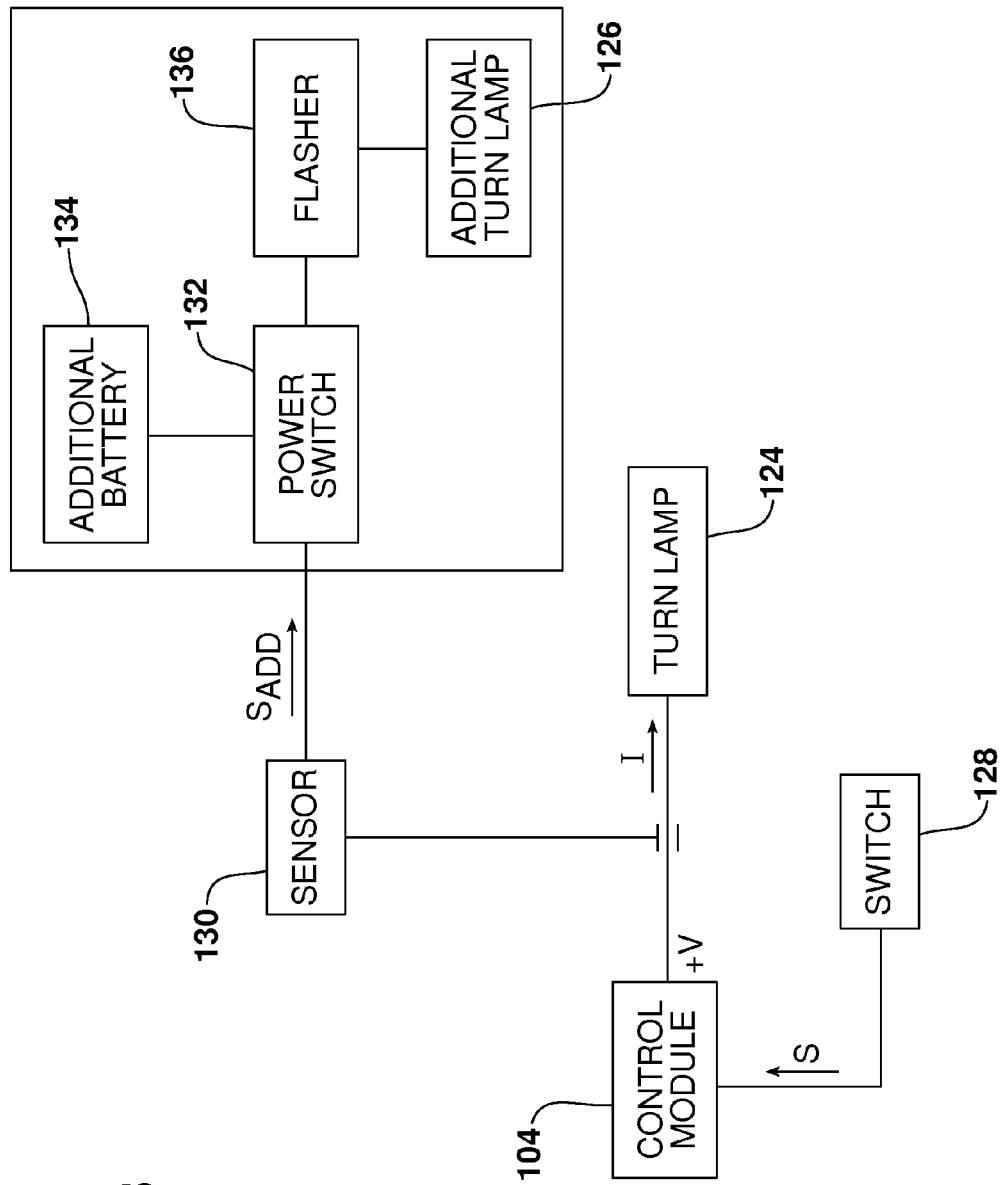
FIG. 8 is an exemplary circuit diagram showing the sense and trigger of powering a flasher and an additional turn lamp.

FIG. 8, for example, shows the above-described sense and trigger interaction between the control module 104 and turn lamp 124, and an additional turn lamp 126. As shown, control module 104 receives an input signal (S) from a stem switch 128. In response, control module 104 applies vehicle power via a power switch to turn lamp 124. Sensor 130 sense the current (I) created by the application of vehicle power and provides an additional control signal $S_{ADD}$ to power switch 132. Power switch 132 switches additional power from additional battery 134 to a flasher 136 in a turn circuit of the additional lighting equipment 52 that initiates flashing of the additional turn lamp 126.

As soon as the stem switch 128 is returned to the "OFF" position and vehicle power is removed from the turn lamp 124 causing it to cease flashing, the sensor 130 will cease triggering operation of the power switch 132 and the additional turn lamp 126 in the additional lighting equipment 52. While this sense and trigger approach could be used for each of the powered components of the additional lighting equipment, the headlamps (high beam and low beam functions), taillamps, park lamps, and license plate lamps do not rely on this approach and are manually operated in the described embodiment.

Figure 9:
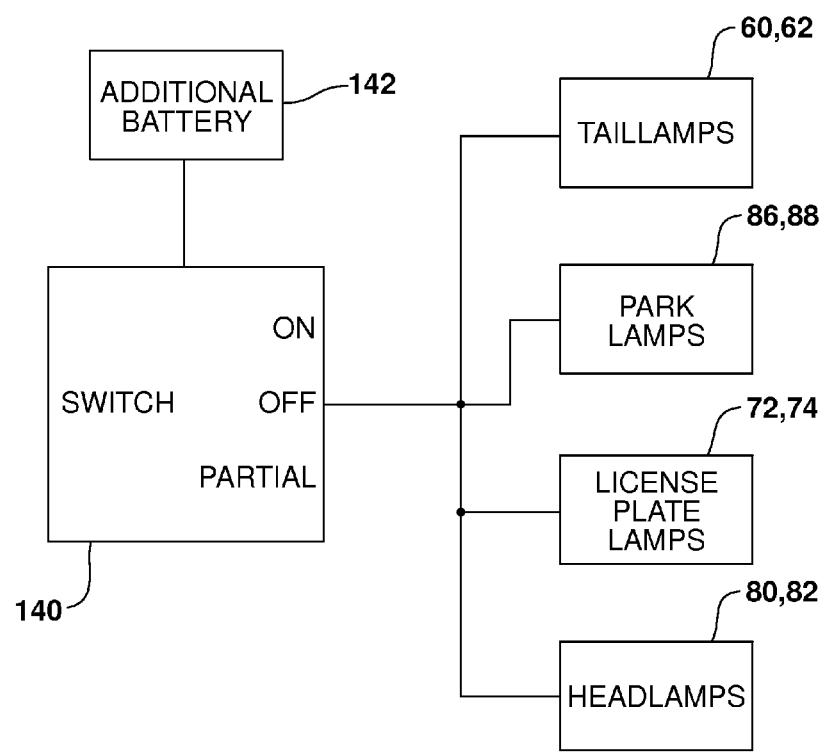
FIG. 9 is an exemplary circuit diagram showing a three position switch for manually powering selected components of the additional lighting equipment.

More specifically, a vehicle occupant manually controls operation of the headlamps 80, 82, taillamps 60, 62, park lamps 86, 88, and license plate lamps 72, 74 by operating a three-position switch 140 as shown in FIG. 9. The three-position switch 140 provides additional power from additional battery 142 for the following functions: (1) all ON; (2) all OFF; and (3) taillamps, park lamps, and license plate lamps ON. The high beam headlamp function, including a flash-to-pass operation of the headlamp, is controlled by driver action using the above-described sense and trigger process in the described embodiment.

In another aspect of the invention, a method of operating a vehicle such that its exterior attributes including its lighting equipment are substantially obscured from visibility includes the steps of covering an exterior of a vehicle 26 with a camouflage 32 except for at least a portion of a plurality of windows 30, supporting additional lighting equipment 52 adjacent the covered lighting equipment 28, and operating the lighting equipment and the additional lighting equipment in parallel. The exterior attributes may include the unique styling and features of the vehicle.

In the method, the lighting equipment 28 is powered by a battery 112 of the vehicle 26 and the additional lighting equipment 52 is powered by a separate additional battery 118. As described above, a separate battery pack is provided that is sufficient to power all of the additional lighting equipment for a single test outing or multiple test outings. The battery pack can form an integral part of the component of the additional lighting equipment 52 or the battery pack can be carried in or on the vehicle 26.

The method may further include the step of sensing the powering of components of the lighting equipment 28, and generating an additional control signal to the additional lighting equipment 52 upon sensing the powering of the components of the lighting equipment which causes power to be provided to like components of the additional lighting equipment. This is the sense and trigger method described above which automatically turns on like components of the additional lighting equipment 52 when a component of the lighting equipment is powered. In the described method, the components which rely on this approach include (e.g., turn lamps, reverse lamps, and brake lamps).

While this sense and trigger approach could be used for each of the powered components of the additional lighting equipment 52, the headlamps (high beam and low beam functions), taillamps, park lamps, and license plate lamps are manually operated in the described method. More specifically, the method may further include the step of controlling the powering step for the additional headlamps, additional taillamps, additional parking lamps, and the additional license plate lamp(s) using a switch. The switch is operated by an occupant of the vehicle and could be, for example, a stem switch for turning on the headlamps or a switch that receives input from a brake pedal.

In summary, numerous benefits result from providing a camouflaged vehicle having additional lighting equipment. This allows for operation of the vehicle while obscuring or preventing public viewing of the unique styling and features of the vehicle. This allows for the new vehicle to be properly road tested and for the various lighting components of the lighting equipment to be operated under normal conditions.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A camouflaged vehicle, comprising:
   a vehicle having lighting equipment and a plurality of windows;
   a camouflage positioned over an exterior of the vehicle and allowing visibility through at least a portion of said plurality of windows; and
   additional lighting equipment supported by said vehicle outside of said camouflage, said additional lighting equipment corresponding to at least a portion of said lighting equipment.

2. The camouflaged vehicle of claim 1, wherein at least a portion of said lighting equipment is visible through said camouflage.

3. The camouflaged vehicle of claim 1, further comprising a control module for controlling said lighting equipment, and wherein said additional lighting equipment is controlled by said control module in parallel with said lighting equipment.

4. The camouflaged vehicle of claim 3, wherein said control module generates control signals to operate said lighting equipment, and wherein sensors, positioned between said control module and said lighting equipment, sense the application of power and generate additional control signals to operate said additional lighting equipment.

5. The camouflaged vehicle of claim 1, further comprising a power source for providing power to said vehicle including said lighting equipment, and an additional power source for providing power to said additional lighting equipment.

6. The camouflaged vehicle of claim 3, wherein said additional lighting equipment includes at least two headlamps, at least two taillamps, at least two stoplamps, at least one high-mounted stoplamp, at least one license plate lamp, at least two parking lamps, at least two intermediate side reflex reflectors, at least two intermediate side marker lamps, at least four side marker lamps, at least 1 backup lamp, at least four turn signal lamps, at least one turn signal operating unit, at least one turn signal flasher, and at least one vehicular hazard warning signal operating unit, and at least one vehicular hazard warning signal flasher.

7. A camouflaged vehicle, comprising:
a vehicle having lighting equipment and a plurality of windows;
a camouflage attached to an exterior of the vehicle and allowing visibility through at least a portion of said plurality of windows; and
additional lighting equipment mounted to an exterior of said camouflage.

8. The camouflaged vehicle of claim 7, wherein said additional lighting equipment includes at least two additional headlamps, at least two additional taillamps, at least two additional parking lamps, and at least one license plate lamp, and further comprising a driver operated switch for controlling said at least two additional headlamps, said at least two additional taillamps, said at least two additional parking lamps, and said at least one license plate lamp.

9. The camouflaged vehicle of claim 8, further comprising a control module for controlling said lighting equipment, and wherein said additional lighting equipment further includes at least two additional turn signal lamps, at least two additional stoplamps, and at least one additional backup lamp, and wherein said at least two additional turn signal lamps, said at least two additional stoplamps, and said at least one additional backup lamp are controlled by said control module in parallel with said lighting equipment.

10. The camouflaged vehicle of claim 9, wherein said control module generates control signals to operate said lighting equipment, and wherein sensors, positioned between said control module and said lighting equipment, sense the application of power and generate additional control signals to operate said at least two additional turn signal lamps, said at least two additional stoplamps, and said at least one additional backup lamp.

11. The camouflaged vehicle of claim 10, wherein at least a portion of said lighting equipment is visible through said camouflage.

12. The camouflaged vehicle of claim 10, further comprising a power source for providing power to said vehicle including said lighting equipment, and an additional power source for providing power to said additional lighting equipment.

13. A method of operating a vehicle such that its exterior attributes including its lighting equipment are substantially obscured from visibility comprising the steps of:
covering an exterior of the vehicle with a camouflage except for at least a portion of a plurality of windows;
supporting additional lighting equipment adjacent said covered lighting equipment; and
operating said lighting equipment and said additional lighting equipment in parallel.

14. The method of operating a vehicle such that its exterior attributes including lighting equipment are substantially obscured from visibility of claim 13, further comprising the steps of powering said lighting equipment using a power source, and powering said additional lighting equipment using an additional power source.

15. The method of operating a vehicle such that its exterior attributes including lighting equipment are substantially obscured from visibility of claim 14, further comprising the steps of sensing the powering of components of said lighting equipment, and generating an additional control signal to said additional lighting equipment upon sensing the powering of said components of said lighting equipment which causes power to be provided to like components of the additional lighting equipment.

16. The method of operating a vehicle such that its exterior attributes including lighting equipment are substantially obscured from visibility of claim 15, wherein said additional lighting equipment includes at least two additional headlamps, at least two additional taillamps, at least two additional parking lamps, and at least one license plate lamp; and
further comprising the step of controlling the powering step for said at least two additional headlamps, said at least two additional taillamps, said at least two additional parking lamps, and said at least one license plate lamp using a switch operated by an occupant of the vehicle.

17. The method of operating a vehicle such that its exterior attributes including lighting equipment are substantially obscured from visibility of claim 13, wherein said lighting equipment includes at least two turn signal lamps, at least two stoplamps, and at least one backup lamp; and further comprising the steps of sensing a control signal generated by a control module and directed to at least one of said at least two turn signal lamps, said at least two stoplamps, and said at least one backup lamp, and providing an additional control signal to a corresponding at least one of said at least two additional turn signal lamps, at least two additional stoplamps, and at least one additional backup lamp.

* * * * *